US00RE42333E

(19) United States
(12) Reissued Patent
Yang

(10) Patent Number: US RE42,333 E
(45) Date of Reissued Patent: May 10, 2011

(54) ELECTRIC APPLIANCE EQUIPPED WITH REDUNDANT BATTERY ENABLED BY THE MAIN POWER SUPPLY

(76) Inventor: Tai-Her Yang, Dzan-Hwa (TW)

(21) Appl. No.: 11/101,659

(22) Filed: Apr. 8, 2005

Related U.S. Patent Documents

Reissue of:
(64) Patent No.: 6,433,508
Issued: Aug. 13, 2002
Appl. No.: 09/769,454
Filed: Jan. 26, 2001

(51) Int. Cl.
*H02J 7/00* (2006.01)

(52) U.S. Cl. ..... 320/103

(58) Field of Classification Search ..... 320/103, 320/107, 112, 113, 114, 115, 116, 126; 307/64, 307/66

See application file for complete search history.

(56) References Cited

U.S. PATENT DOCUMENTS 5,568,038 A * 10/1996 Tatsumi ..... 320/103
6,043,626 A * 3/2000 Snyder et al. ..... 320/113
6,140,800 A * 10/2000 Peterson ..... 320/103
6,304,059 B1 * 10/2001 Chalasani et al. ..... 320/118

* cited by examiner

*Primary Examiner* — Edward Tso
(74) *Attorney, Agent, or Firm* — Bacon & Thomas, PLLC

(57) ABSTRACT

A system to provide power to a peripheral device is equipped with a primary cell, secondary rechargeable cell, or super capacitor, and a redundant battery which is charged through a power control circuit, the redundant battery in turn charging the primary cell, secondary rechargeable cell, or super capacitor through another power control circuit connected between the redundant battery and the primary cell, secondary rechargeable cell, or supper capacitor. The redundant battery may be located in the peripheral unit, so as to charge the primary cell, secondary rechargeable cell, or super capacitor when the peripheral unit is disconnected from a base unit, and/or in the base unit, so as to charge cells in the peripheral unit when the base unit is disconnected from a main power supply. The peripheral unit may be a wireless mouse, trackball, keyboard, telephone handset, or the like, and the base unit may include a receiver as well as a power supply interface.

10 Claims, 18 Drawing Sheets

ELECTRIC APPLIANCE EQUIPPED WITH REDUNDANT BATTERY ENABLED BY THE MAIN POWER SUPPLY

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an electrical appliance equipped with a redundant battery enabled by a main power supply to charge standby cells, featuring convenience of operation at reduced cost.

2. Description of the Prior Art

With most wireless peripheral or control means, such as, a wireless computer mouse, cordless trackball, cordless keyboard, or cordless telephone set for indoor use, it is standard practice to have them equipped with a primary cell, a secondary rechargeable cell or super capacitor, or similar energy storage means to drive associated circuits, and to eventually transmit signals to receivers, in one-way, i.e., simplex, or two-way, i.e., duplex mode of operations.

A drawback of the above-mentioned cordless peripheral installation is that due to gross power consumption, charging or replacement of cells is often required, which is especially annoying when the unit is suspended or on stand by for charging to functionable power. A computer, information-enriched household electric appliance, indoor cordless telephone set, or the main unit of an electric appliance is equipped with a reception circuit which drives a reception device, or a two-way transceiver device or has an A.C. or D.C. power supply which drives other interface devices. The power can be provided by the main power supply to a computer, information-enriched electric appliance, indoor cordless telephone set or electric appliance, or alternatively, indirectly from wired peripheral devices powered by the main power supply, such as a receiver or a keyboard or other wired peripheral device. The power source is connected to a power supply interface which supplies the load with power and, as an additional feature, charges one or more sets of batteries through ports PO in or on the main unit of a computer, information-enriched household electric appliance, indoor cordless telephone, other electric appliance, or notebook computer or monitor; or alternatively, in the form of one or more sets of redundant rechargeable batteries and ports P0' installed on a wired peripheral device such as a keyboard or receiver set attached to a cord assembly, or in the form of one or more sets of redundant rechargeable batteries and ports P0' on cordless peripheral equipment, wherein the power source is the main power supply.

SUMMARY OF THE INVENTION

The redundant battery and port P0' for charging purposes according to the invention may be installed as a redundant set on the casing, receiver, keyboard, or other wired peripheral device associated with an electric appliance, or in or on a computer unit, an information-enriched household electric appliance, an indoor cordless telephone set, or installed into a cordless peripheral so that the main power supply can be supplied with low voltage D.C. or be in an A.C. line voltage which converts to a D.C. source through transformation and rectification to feed a redundant battery through a port P0', or peripheral circuit. Power is provided to one or more sets of redundant batteries for charging purposes through a port P0', which optionally resides in or on the main casing, monitor or receiver, so as to charge in turn the redundant energy storage device ESD101' which consists of a secondary cell or super capacitor coupled thereto. The main power supply may further be coupled to a power supply interface serving as input to the cordless peripheral via the power supply output interface, to regulate the charging voltage and charging with respect to the energy storage device ESD101 in a cordless peripheral device, as well as actuation of control in the cordless peripheral device, or actuation of the emission circuit T101 or two-way transceiver RT101. Furthermore, the same battery and port P0', of the one or more sets serves as redundant equipment for charging purposes. When required, the battery serves as an redundant energy storage device ESD101'.

DETAILED DESCRIPTION OF THE PREFERRED EMBODIMENTS

Figure 1:
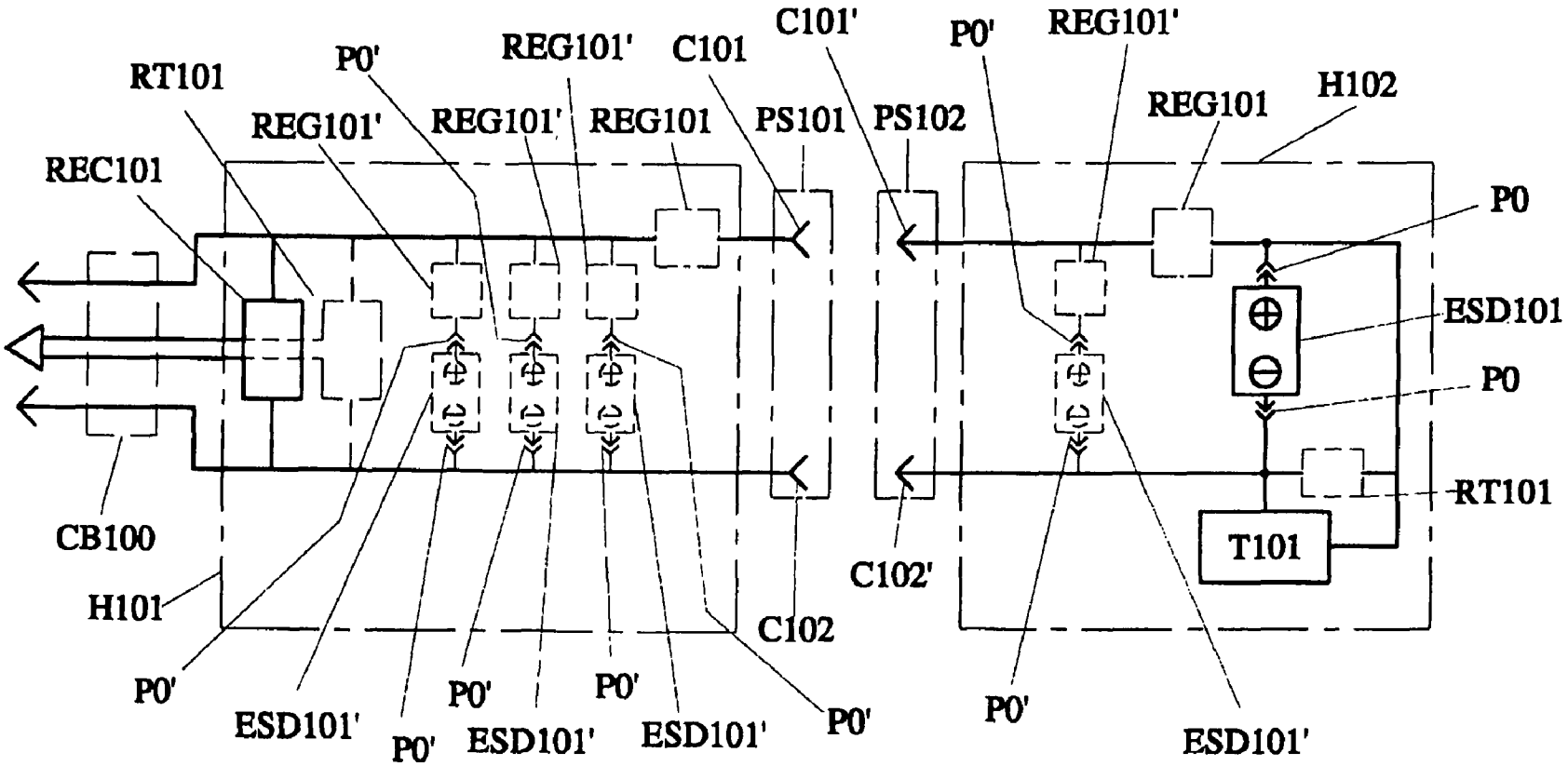
FIG. 1 is a block diagram of a circuit constructed in accordance with the principles of a preferred embodiment of the invention.

As shown in FIG. 1, a block diagram of the circuit illustrates the preferred embodiment of the invention in the form of a redundant battery which connects to a main power supply and supplies an electric appliance with power not shown in the drawing, comprising:

A receiver circuit REC101 comprises an R.F., infrared or ultrasonic receiving circuit which further is comprised of solid-state electronic elements or electromechanical components to receive manually controlled or audio or video signals. The circuit REC101 is installed onto a receiver casing H101, i.e., the main casing of a computer, information-enriched household electric appliance, indoor cordless telephone set, electric appliance, a monitor unit, a notebook computer or a peripheral device such as keyboard. Once the computer or electric appliance accesses power by way of cord set CB100, the receiver circuit RC101 becomes a source of power to the one or more sets of redundant batteries and port P0' for charging purposes, located within the receiver casing H101 and to the receiver itself. The received signal may be transferred to the main unit via cord set CB100, where the cordless interface is a two-way duplex mode. This receiver circuit REC101 may be replaced with a two-way transceiver RT101, where the main power supply is an A.C. system. The receiver circuit may be equipped with a converter for rectification of A.C. into D.C. to drive the receiver circuit and to serve as a source of charging power to the redundant battery through port P0', or for feeding to the power output interface PS101.

A cord set CB100 is furnished between the power supply to a receiver, a main computer unit, an information-enriched household electric appliance, an indoor cordless telephone set or a monitor. For example, the cord set can include socket/plug sets of PS2, USB, IEEE1394 or other chosen interface specification to connect the power supply to the main computer unit, information-enriched electric appliance, indoor cordless telephone or monitor unit, or for direct connection inside a casing in symbiotic relation with the devices, so as to transmit signals and to supply the power needed to empower the redundant battery through port P0' in the casing of a computer, other electric appliance or monitor, or other cord-bearing peripheral and relevant circuit.

A power output interface PS101 is composed of an electric power transmission means and installed onto an independently provided receiver casing, where the receiver is in a symbiotic relationship with the main unit or peripheral device. The interface may be installed on the main casing unit or on the casing of a monitor, a receiver or other peripheral device. The power output interface PS101 is preferably a like-electrode-on-like-electrode coupling with a power input interface PS102 on a cordless peripheral, whereby energy on the main unit is transferred to electric energy storage unit ESD101 in the cordless peripheral.

A power input interface PS102, in the form of an electric power transmitter composed of conductive contacts or a plug/socket assembly, couples the like-electrode couplings with the power output interface PS101 on the main unit casing, the monitor, the receiver or other peripheral, whereby the electrical energy delivered to the main unit is transferred to the electric energy storage ESD101 in the cordless peripheral or in the redundant electric energy storage ESD101.

A coupling means links the power output interface with the power input interface and can include:

1. A means to transmit electric energy comprising matching means to couple the power output interface PS101 with the power input interface PS102;
2. A means to transmit electric energy comprising means to superpose the power output interface PS101 with the power input interface PS102;
3. A means to transmit electric energy by interposition of a supplemental magnet between the power input interface PS102 and the power output interface PS101;
4. A means to transmit electric energy by mounting electromagnetically conductive contacts between the power output interface PS101 and the power input interface PS102;
5. A means to randomly charge by interpositioning a plug/socket assembly between the power output interface PS101 and the power input interface PS102;
6. A means to optionally charge by the furnishing a power cord interposed between the power output interface PS101 and the power input interface PS102. The power cord and its corresponding plug/socket assembly can be removed, stowed away or wound inside the casing;
7. A polarity error-proofing means permitting mutual coupling destined for the transmission of electric energy between the power output interface PS101 and the power input interface PS102, featuring:
   (A) a series connection of a reverse isolation diode in the power supply circuit; or
   (B) a polarity error-proofing geometry in the conductive contacts or plug/socket assembly; or
   (C) a supplemental magnet sub-assembly in the conductive contacts or plug/socket assembly between the power output interface PS101 and the power input interface PS102, such that mutual attraction will result when coupling of the correct polarity is made between the output side and the input side of the power supply, but mutual repulsion would ensue if the coupling is unmatched due to a polarity error, thus achieving a polarity error detection effect.

A receiver casing H101 can be either independent or integral with the main casing unit, monitor or other peripheral, which houses the receiver circuit REC101 or two-way transceiver RT101. The receiver casing H101 is furnished with one or more sets of redundant batteries and ports P0' for charging purposes, fitted with conductive contacts C101, C102, or a power supply plug/socket assembly, or adapted for power cord storage and may be concurrently furnished with an extension hub.

A peripheral circuit T101 comprising solid-state electronic elements or electromechanical parts, is driven by the energy storage device ESD101 which consists of primary or secondary cells or a super capacitor, so as to convert input by manual operation or audio or video signals into electric signals which is to be further converted into R.F., infrared, ultrasonic signals for transmission to the transceiver REC101 that forms part of the receiver. Where the cordless interface features two-way transmission/receiving capabilities, the peripheral circuit T101 may be replaced by a two-way transmission/receiving device RT101.

A cordless peripheral casing H102 is in the form of an independent housing complete with R.F., infrared or ultrasonic transmitting keyboard, mouse, trackball or other cordless peripheral devices. These devices incorporate other control or operational capabilities, the relevant mechanisms, controls for ad hoc peripherals and the emission circuit T101, or a two-way transceiver circuit device RT101, other relevant circuit structure, including furnishing one or more sets of batteries and ports P0, or the electric energy storage EDS101 which comprises a primary cell, a secondary cell or super capacitor, to account for a power source of a cordless peripheral, where the cordless peripheral features rechargeable capabilities. There may be provided one or more sets of redundant batteries and ports P0' for charging purposes, to be incorporated into relevant circuit structure in a redundant energy storage ESD101' for the secondary cell or super capacitor. On the casing may be mounted a power input interface PS102 which consists of a plug/socket assembly or of conductive contacts C101', C102'. There may be provided a power control REG101, or a redundant power control REG101' specifically for power storage ESD101 or redundant power storage ESD101' or for both in common service. The power storage ESD101 and redundant power storage ESD101' are provided where needed. Power control REG101 or redundant power control REG101' controls electric power coming from power output interface PS101, for the purpose of charging the power storage ESD101 or redundant power storage ESD101'.

A power control REG101 or a redundant power control REG101' for installation in the main casing of a computer, an information-enriched household electric appliance on a monitor casing, or a receiver, where one or more sets of linear analogue voltage degrading circuit or wave interception (PWM) circuit, composed of electromechanic or solid-state electronic parts on the casing of a cord-bearing peripheral or cordless peripheral, to regulate the power supply required for the redundant battery through port P0' for charging purposes fitted on the main casing of a computer, an information-enriched household electric appliance, an indoor cordless telephone set, other electric appliance, or on a monitor casing, a receiver or other peripheral equipment. To control the electric power that is fed to the power input interface PS102 on the cordless peripheral device, an illuminated display of the condition of charging control by current restriction or voltage restriction with respect to the energy storage ESD101 or redundant energy storage ESD101' is included.

Any of the electric appliances defined in the foregoing is furnished with a redundant battery that is fed by a main power supply. The power control circuit, in addition to yielding control, regulation and display performances by means of conventional technique such as linear analogue circuit or wave interception circuit(PWM), may be executed by a series connection with zener diodes, or with any other diode having a zener effect and photo-emitting effect at the same time, so-called light-emitting diode to achieve in concurrent voltage degrading and display of current transmission state at the same time. The circuits below are examples featuring convenience at reduced cost.

Figure 2:
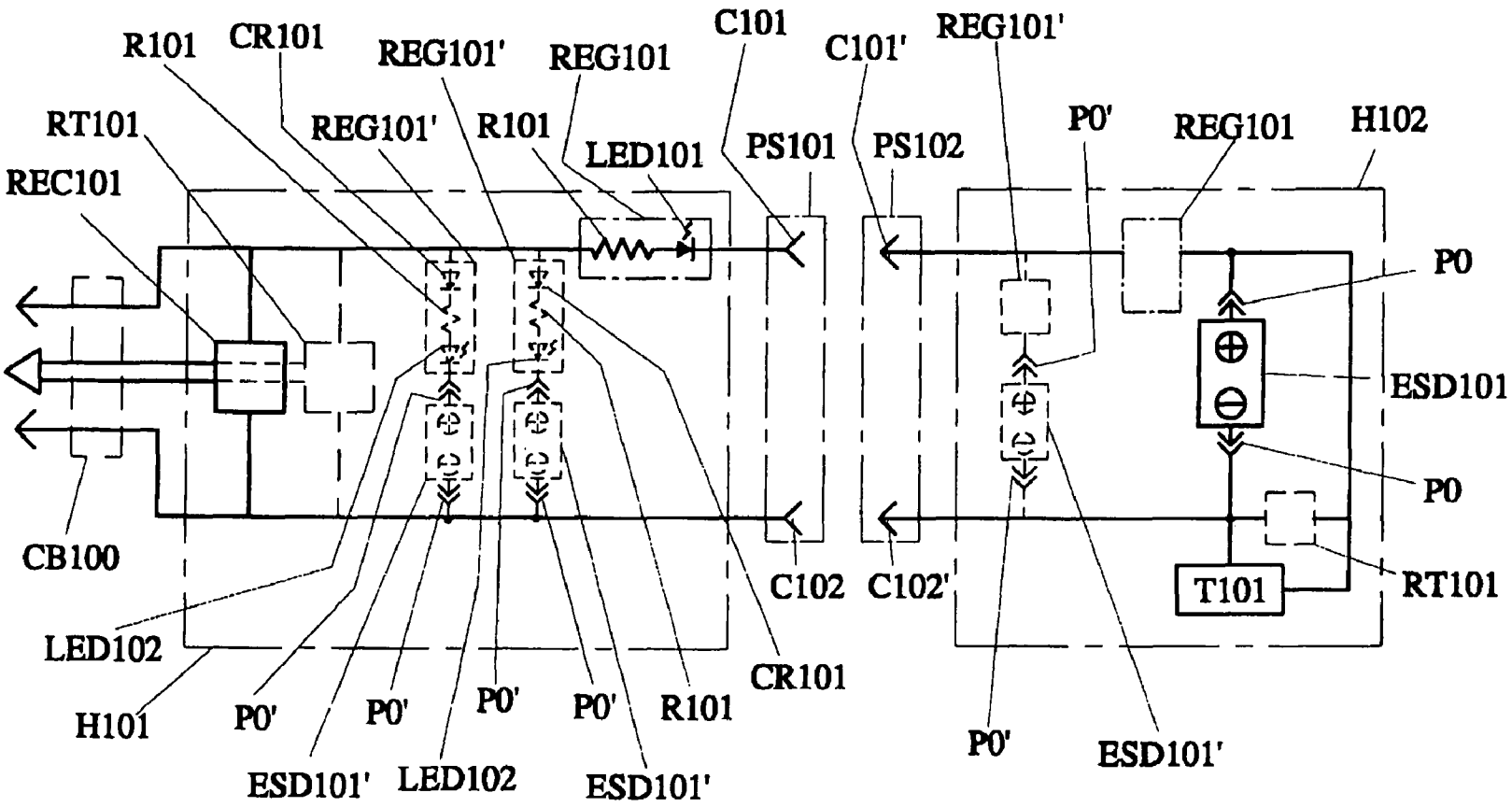
FIG. 2 is a block diagram of an implementation of the preferred circuit in which the power supply control comprises a series connection, a photo-emitting diode, and a current limiting resistor.

Referring to FIG. 2, a block diagram of an implementation of the preferred circuit in which the power control means is comprised of photo-emitting diodes and current limiting resistors in series connections. Multiple sets of the electric energy storage ESD101 and the redundant electric energy storage ESD101' are in series with the available power control REG101 and the redundant power control REG101' before being placed in parallel across the D.C. charging power supply. The power control device is composed of a light-emitting diode LED101 (including one or more in series or in parallel) in forward series with the D.C. power source which produces a voltage degrading or light emission capability, as reflected in a charging condition. Optionally, a series connection with a current limiting resistor R101, may be chosen to protect from short circuits. Also, a forward series connection of an isolation diode CR101 is another option to prevent back flow.

Figure 3:
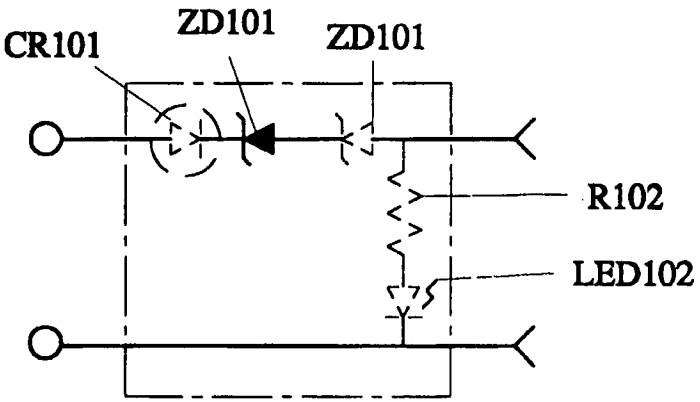
FIG. 3 illustrates an implementation of the preferred embodiment in which the power supply control employs a zener diode to downgrade the voltage.

FIG. 3 is an example employing a zener diode ZD101 used in a circuit of a power control device for its voltage degrading characteristics. In this instance, the zener diode is in series with the output terminal, and the voltage of the zener diode is taken as the level of the voltage degradation between the power source and the output interface. Optionally, a charging state display circuit comprising a photo-emitting diode LED102 and a current limiting resistor R102 connected in series may be in parallel across the output terminals.

Figure 4:
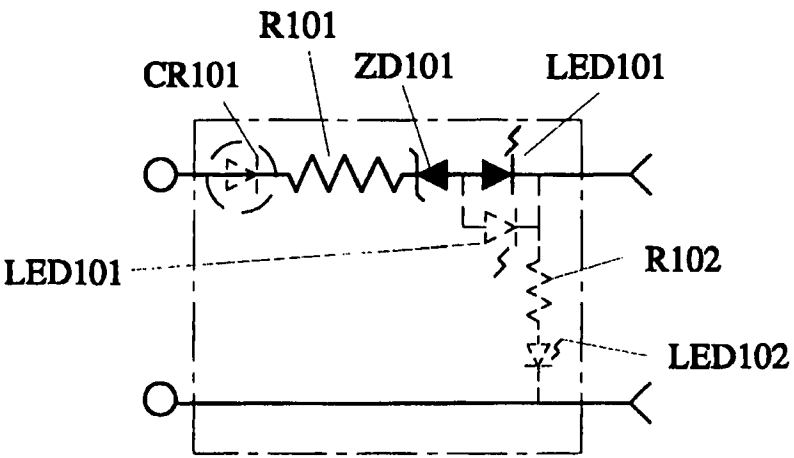
FIG. 4 illustrates an implementation of the preferred embodiment in which the power supply control circuit features both illumination and voltage downgrading capabilities.

As further illustrated in the example given in FIG. 4, covering a circuit for the photo-emitting and voltage degradation power control device pursuant to the invention, a charging condition display circuit composed of a zener diode ZD101 (may comprise one or more of same in series or parallel connections) in series with a photo-emitting diode LED101 (comprising, where desired, one or more of the same connected in series or in parallel) having voltage degradation as well as light emitting capabilities, further in series with a current limiting resistor R101 and optionally in series again with an isolation diode CR101 at the input end, or alternatively, or additionally in parallel with a series connection of photo-emitting diode LED102 and current limiting resistor R102 on the output end, to serve the purpose of voltage degradation and displaying charging states at the same time.

Figure 5:
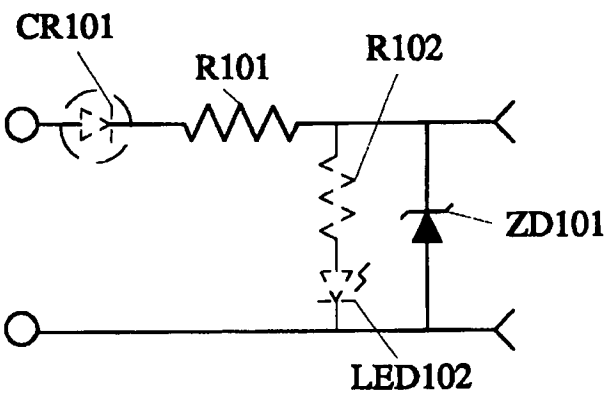
FIG. 5 illustrates an implementation of the preferred power supply control in which a steady output voltage is provided by a combination of current limiting resistors with zener diodes.

FIG. 5 is an example of a power control device circuit in which the output is released in stabilized voltage by the composition of a current limiting resistor R101 with zener diode ZD101. The current limiting resistor R101 is in series between the power supply and the output interface, while the zener diode ZD101 is connected in parallel across the output interface to make for an output of stabilized voltage. An isolation diode CR101 may be placed in series at the input end, or alternatively where a charging state display circuit is needed, a light emitting diode LED102 in series with current limiting resistor R102 may be placed in parallel across the output terminal.

Figure 6:
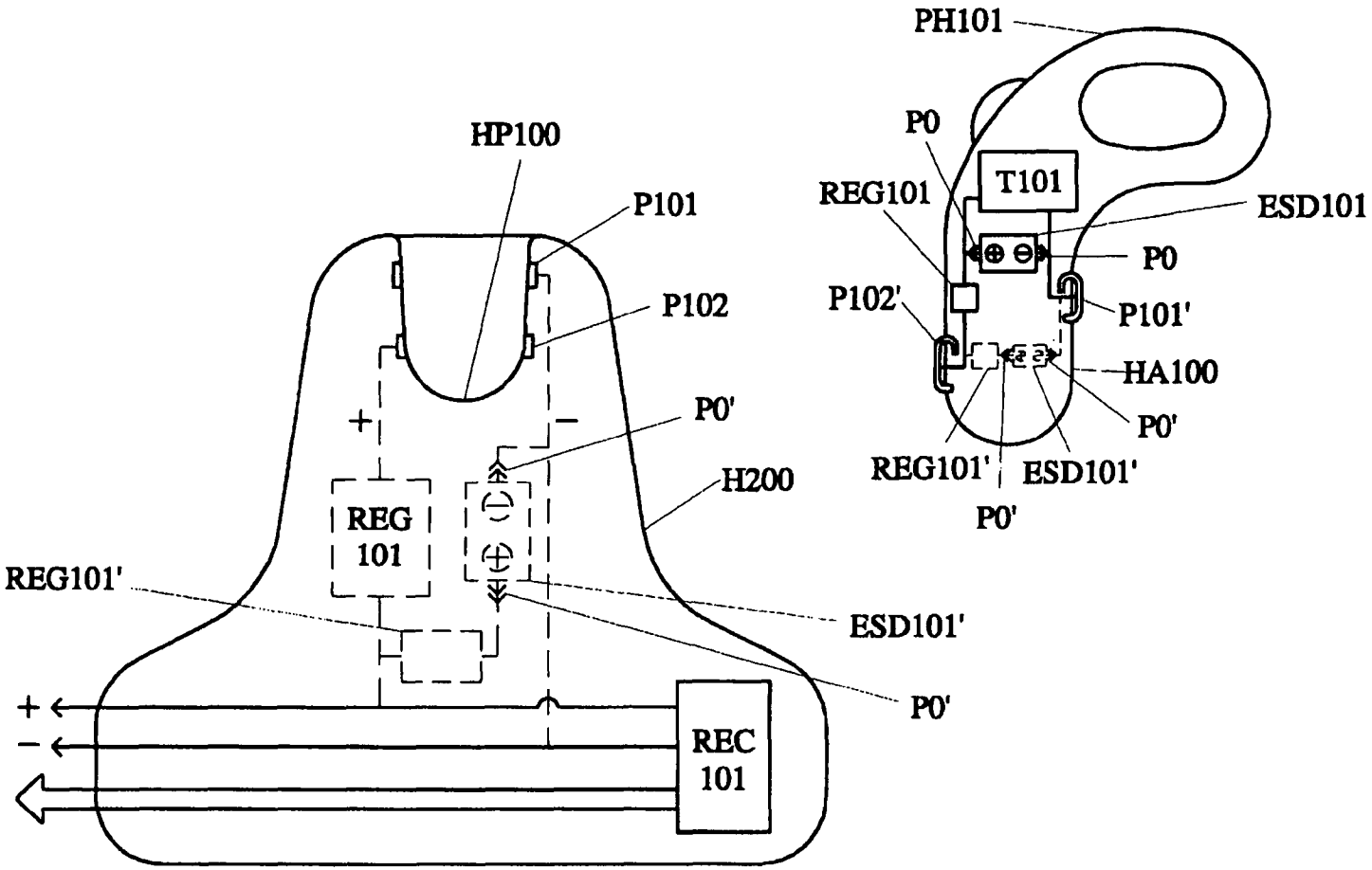
FIG. 6 illustrates an example of the invention applied to a hand-held cordless control, with the receiving circuit serving the purpose of a power supply output interface.

An electric appliance pursuant to the invention is equipped with a redundant battery owing its power to the main power supply. Among various embodiments of the application, apart from structures in which casings are installed independent of each other, it is also possible to correlate by coupling engagement the receiver compartment with cordless peripheral devices, the coupling may for example may be through the intervention of an electric transmission interface. FIG. 6 is an example of a subject appliance equipped with a redundant battery owing its power to the main power supply, as applied to a hand-held type cordless control means. The receiver circuit also functions as a power output interface in which the cordless interface of the hand-held type cordless control PH101 incorporates one or more set of batteries and ports P0 to be loaded with a primary cell, secondary rechargeable cell, or super capacitor electric energy storage ESD101, which provides a source of power to control the cordless peripheral device. There may be additionally provided one or more sets of redundant batteries and ports P0' for charging purposes, for incorporation into relevant circuitry in a secondary cell or a super capacitor, or otherwise redundant electric storage ESD101', on handle HA100, and where needed, be provided with a power input interface composed of conductive contacts P101', P102' or a plug/socket assembly. The receiver, in the form of a chassis casing H200 has a sunken seat HP100 for coupling with the handle HA100 of the hand-held type cordless control PH101. The chassis casing H200 incorporates one or more sets of redundant batteries and ports P0' for charging purposes, and optionally annular or pieces of conductive contacts P101, P102 or plug/socket assembly serving as a power output interface for coupling with the annular or piece of conductive contacts P101', P102' or plug/socket assembly serving as power input interface for the handle HA100 of the hand-held type cordless control PH101, to serve power transmission purposes. Structurally, both the handle HA100 and the sunken seat HP100 may be geometrically designed such that polarity coupling errors are prevented.

Figure 7:
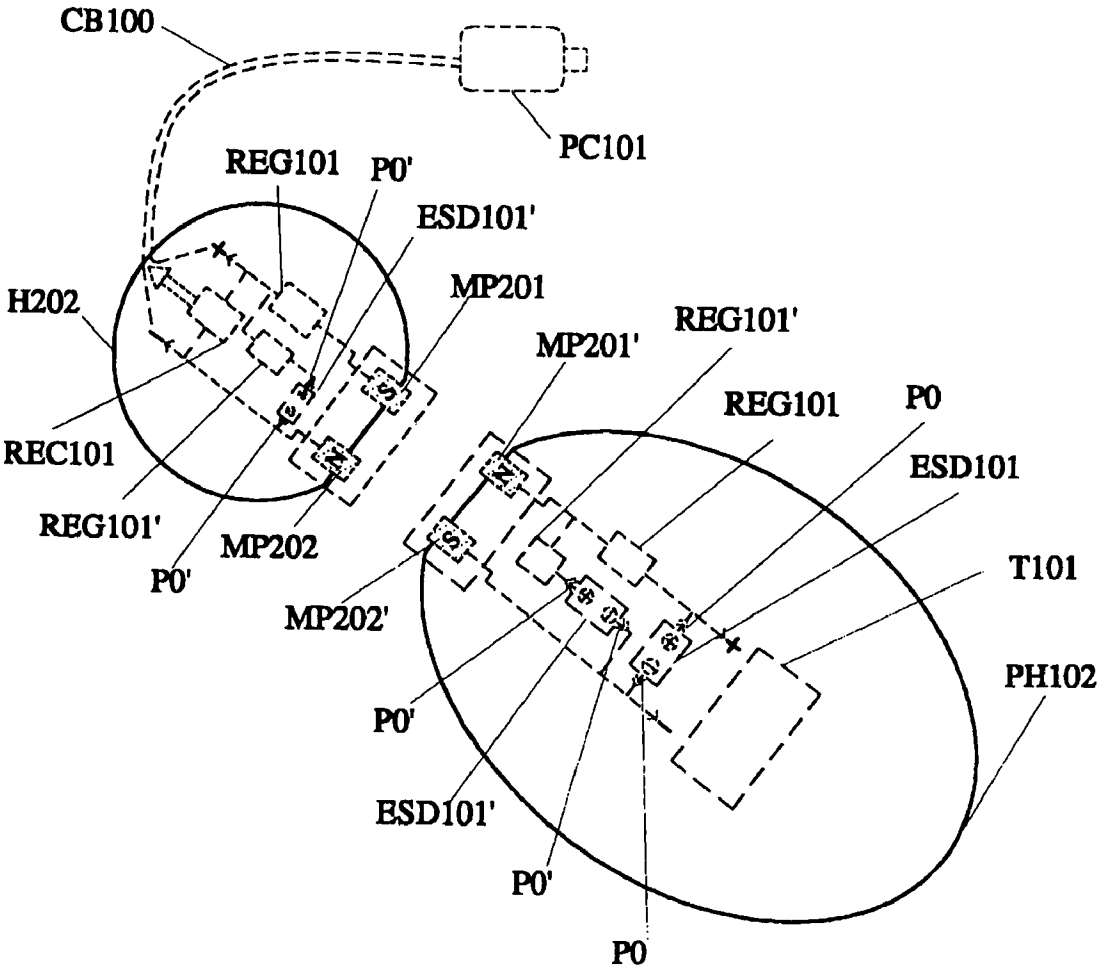
FIG. 7 illustrates an example of the invention in which a receiver and cordless peripheral are each furnished with conductive magnet contacts arranged to attract each other for the purpose of transmitting power.

FIG. 7 is an example wherein both the receiver and the cordless peripheral are equipped with conductive contact counterparts which, when coupled together, can transmit electric power, through the cordless interface to the cordless peripheral PH102. The cordless peripheral PH102 is provided with one or more sets of batteries and ports P0 to house the primary cell, secondary rechargeable cell or super capacitor energy storage ESD101. To account for a power source of control of the cordless peripheral, where needed, there may be installed additionally one or more sets of redundant batteries and ports P0' for charging purposes by the laying of a secondary rechargeable cell or super capacitor, other redundant energy storage ESD101' or a similar circuit arrangement. On one end of the cordless peripheral PH102 may be provided conductive contacts MP201', MP202'. The receiver casing H202 may accommodate one or more set of redundant batteries and ports P0' for charging purposes, which are matched with correspondent conductive magnetic contacts MP201, MP202 such that when both parts are coupled without polarity error, power transmission is made. The receiver may be integral with the main unit or substantiated in an independent casing, associated with the main unit by means of a wire CB100 and plug PC101, whereas power control REG101 and redundant power control REG101' may be installed on the casing H202 of the cordless peripheral PH102 or receiver, as appropriate.

Figure 8:
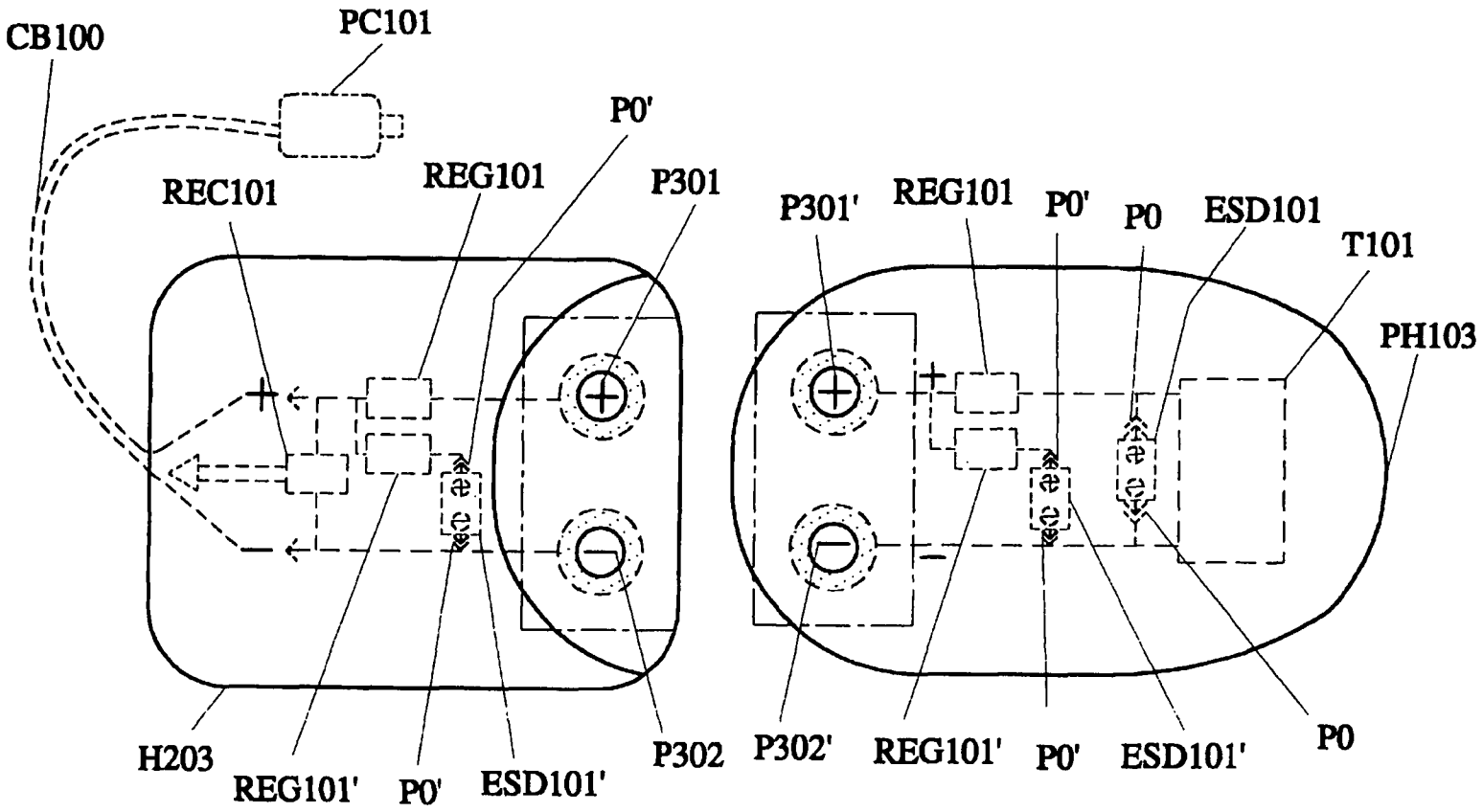
FIG. 8 illustrates an implementation of the preferred embodiment in 5 which the contacts are in the form of a convex-concave configuration to facilitate mutual coupling.
Figure 9:
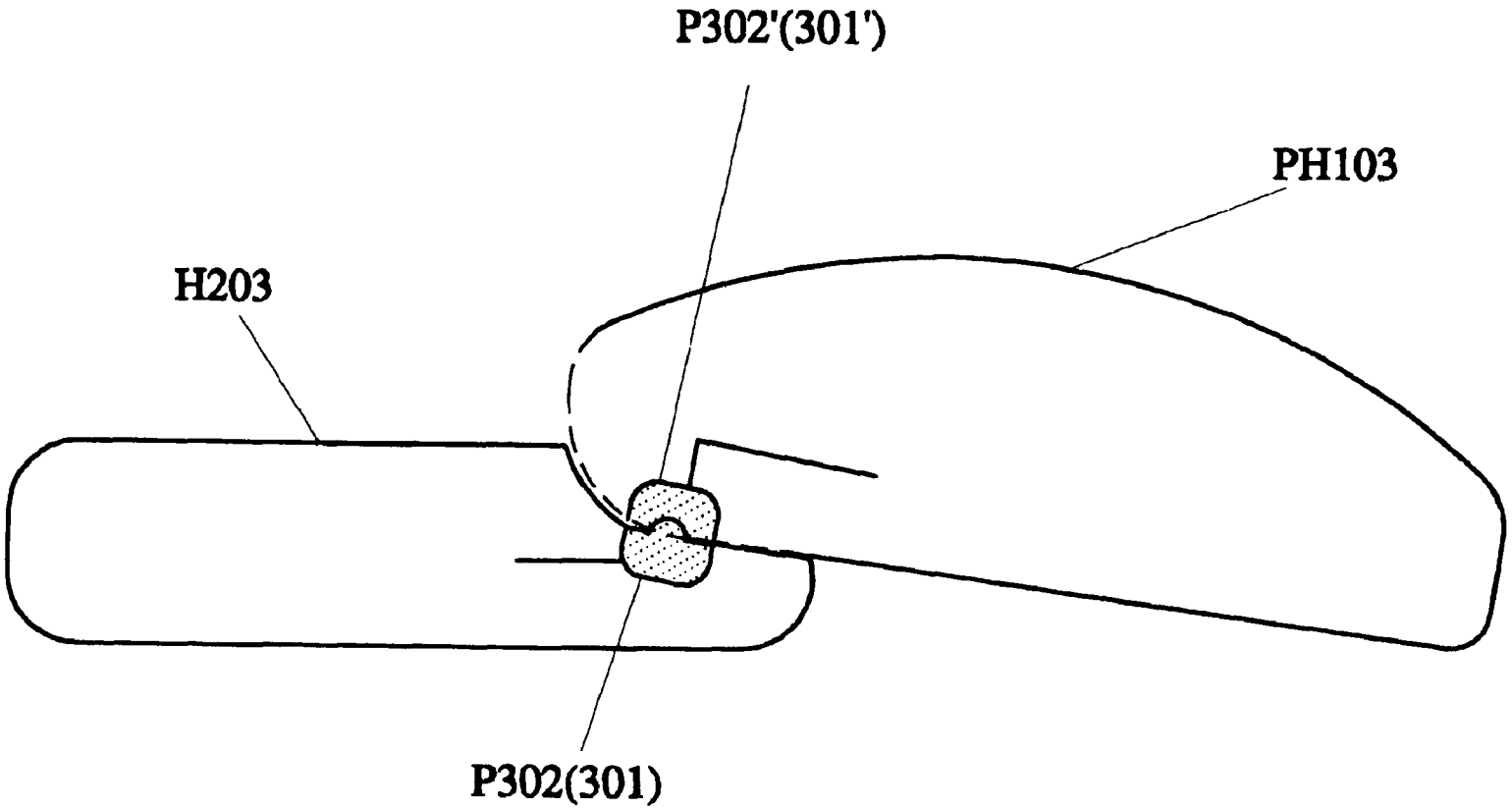
FIG. 9 is a sectional view of the implementation illustrated in FIG. 8, taken at an angle.

FIG. 8 is an example in which the contacts are configured to facilitate interactive coupling. The receiver casing H203 houses one or more sets of redundant batteries and ports P0' for charging purposes and is optionally furnished with conductive contacts P301, P302. The cordless peripheral PH103 may accommodate one or more sets of batteries and ports P0 into which may be introduced a primary cell, a secondary rechargeable cell or super capacitor energy storage ESD101, to account for control of power to the cordless peripheral. There may be optionally furnished one or more sets of redundant storage cells and ports P0' for charging purposes when loaded with a relevant circuit arrangement such as a secondary cell, a super capacitor, or other energy storage means ESD101'. Where needed the cordless peripheral PH103 may be furnished with conductive contacts P301', P302' with a convex-concave coupling with corresponding conductive contacts P301, P302. Transmission of power is thus enabled. A sectional view of the coupling taken at an angle is given in FIG. 9.

Figure 10:
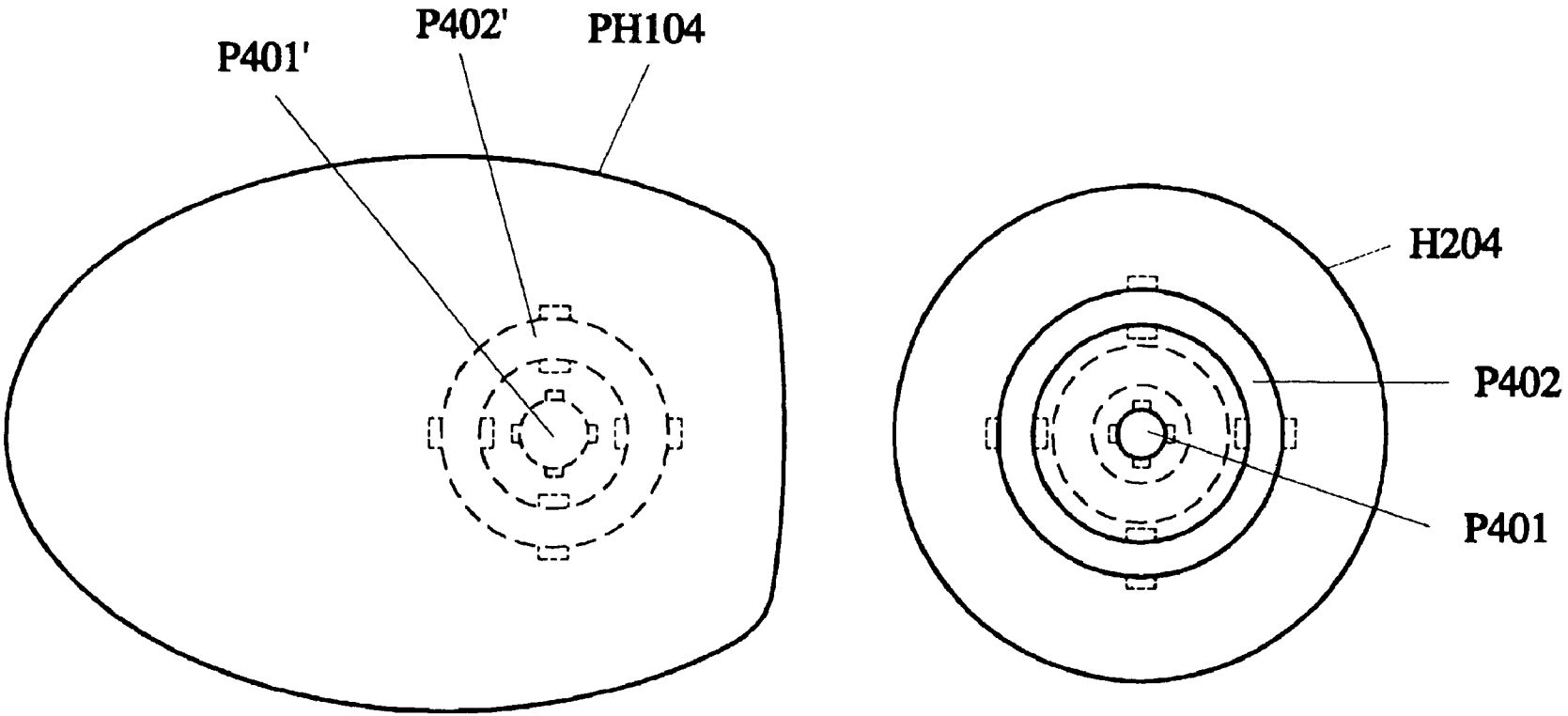
FIG. 10 illustrates an example of the invention in which the contacts are structured concentrically.
Figure 11:
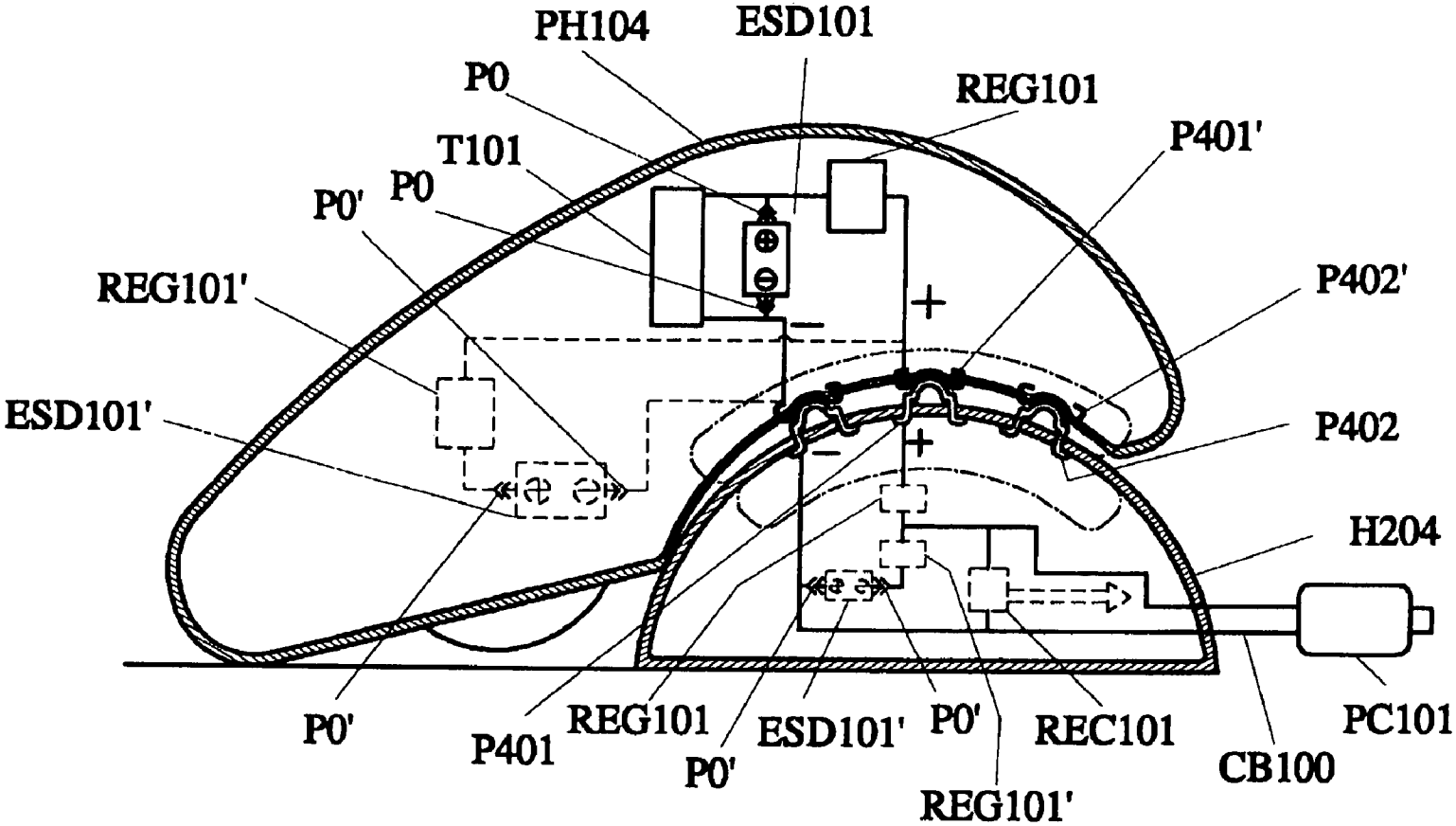
FIG. 11 is a sectional view, taken at an angle, of the example given in FIG. 10.

FIG. 10 is an example of a concentric conductive contact. The receiver casing H204 houses one or more sets of redundant batteries and ports P0' for charging purposes, and concentric conductive contacts P401, P402. The cordless peripheral PH104 houses one or more sets of batteries and ports P0 to accommodate the energy storage means ESD101 in the form of a primary cell, secondary rechargeable cell or super capacitor, to account for control of power to the cordless peripheral device. There may be installed one or more sets of redundant batteries and ports P0' for charging purposes, and a secondary cell or super capacitor, or redundant electric energy storage means ESD101'. Where necessary, the cordless peripheral PH104 may be provided with concentric annular conductive contacts P401', P402' meant for randomized annular coupling with corresponding conductive contacts P401, P402 on the receiver, to serve as power transmission. A sectional view of the coupling in a lateral profile, is given in FIG. 11.

Figure 12:
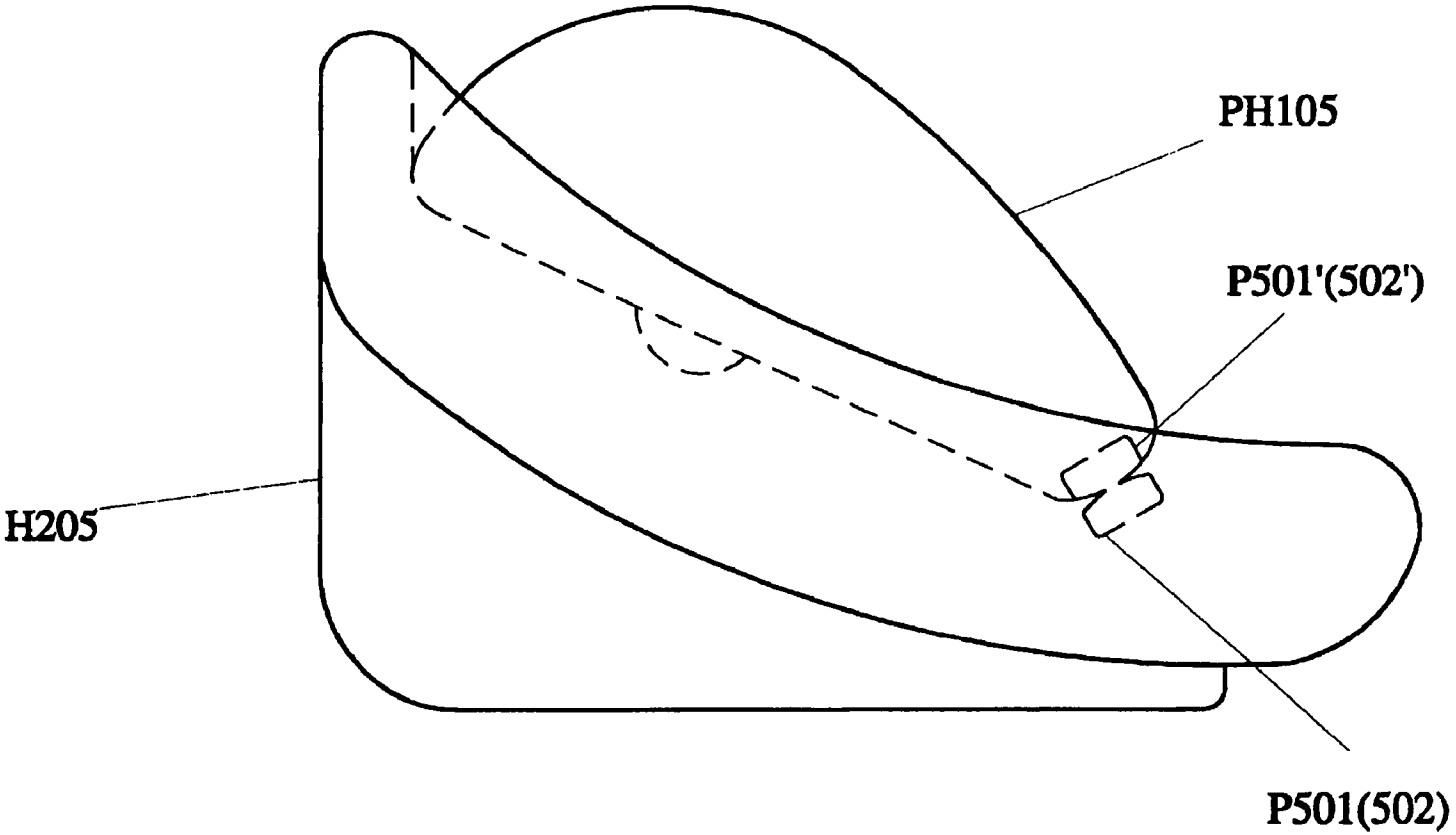
FIG. 12 illustrates an example of the invention in which a receiver and cordless peripheral are coupled together in a seated cushion configuration.
Figure 13:
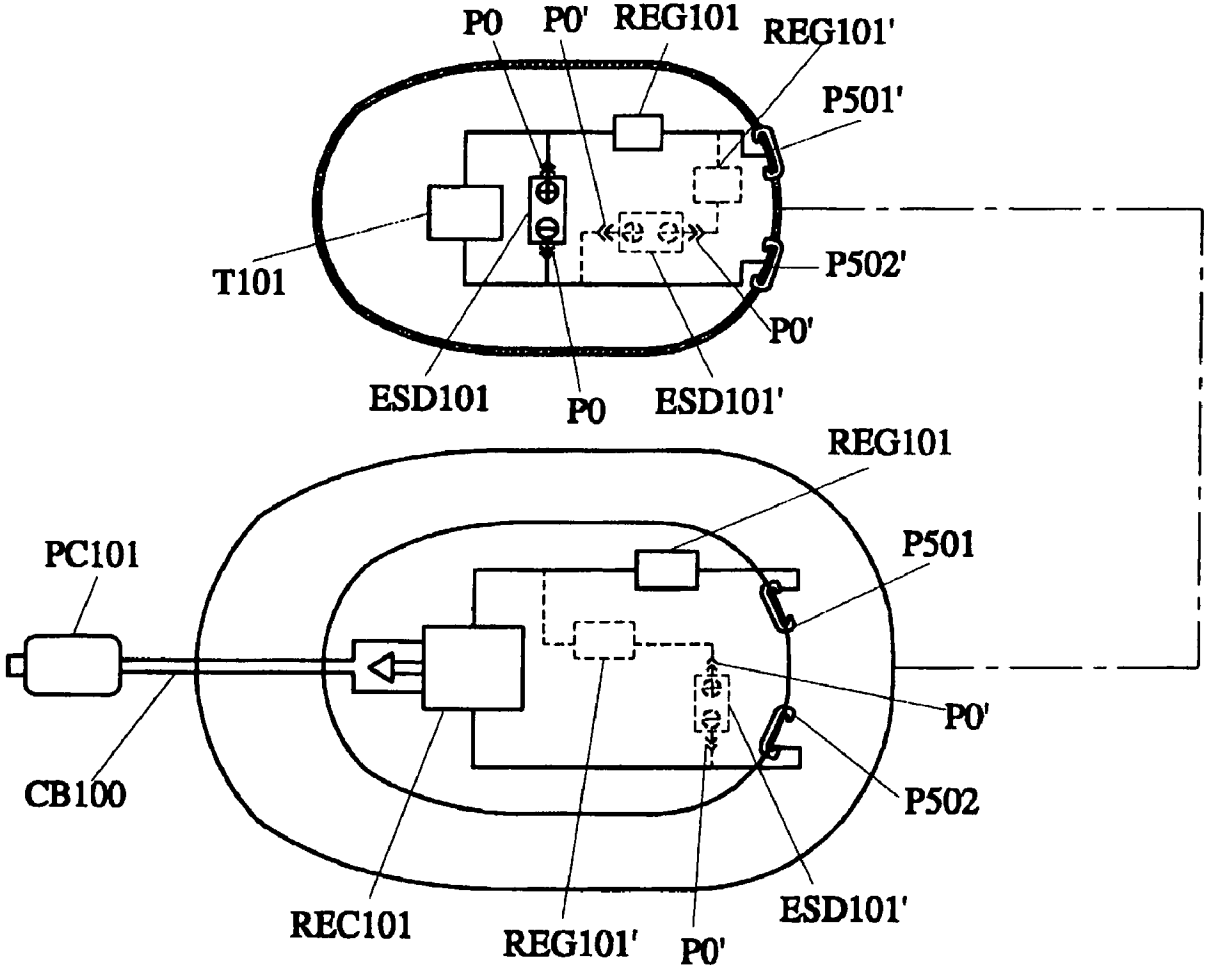
FIG. 13 is a sectional view of the example given in FIG. 12.

FIG. 12 is an example of coupling the receiver with a cordless peripheral in chassis-borne engagement. Structurally, one or more sets of redundant batteries and ports P0' for charging purposes is furnished on the receiver housing H205 attached to the chassis, meanwhile optionally provided conductive contacts P501, P502 and cordless peripheral means PH105 are furnished with one or more sets of batteries and ports P0 serving to accommodate a primary cell, secondary rechargeable cell, or super capacitor. Energy storage means ESD101 controls the power to the cordless peripheral devices, however, there may be optionally provided one or more sets of redundant batteries and ports P0' for charging purposes to accommodate the circuit arrangement for the secondary cell or super capacitor or otherwise redundant energy storage means ESD101'. The cordless peripheral PH105 may be equipped with conductive contacts P501', P502' which matches with correspond counterpart contacts P501, P502 provided on the receiver to provide power. A sectional view of the coupling match is given in FIG. 13.

Figure 14:
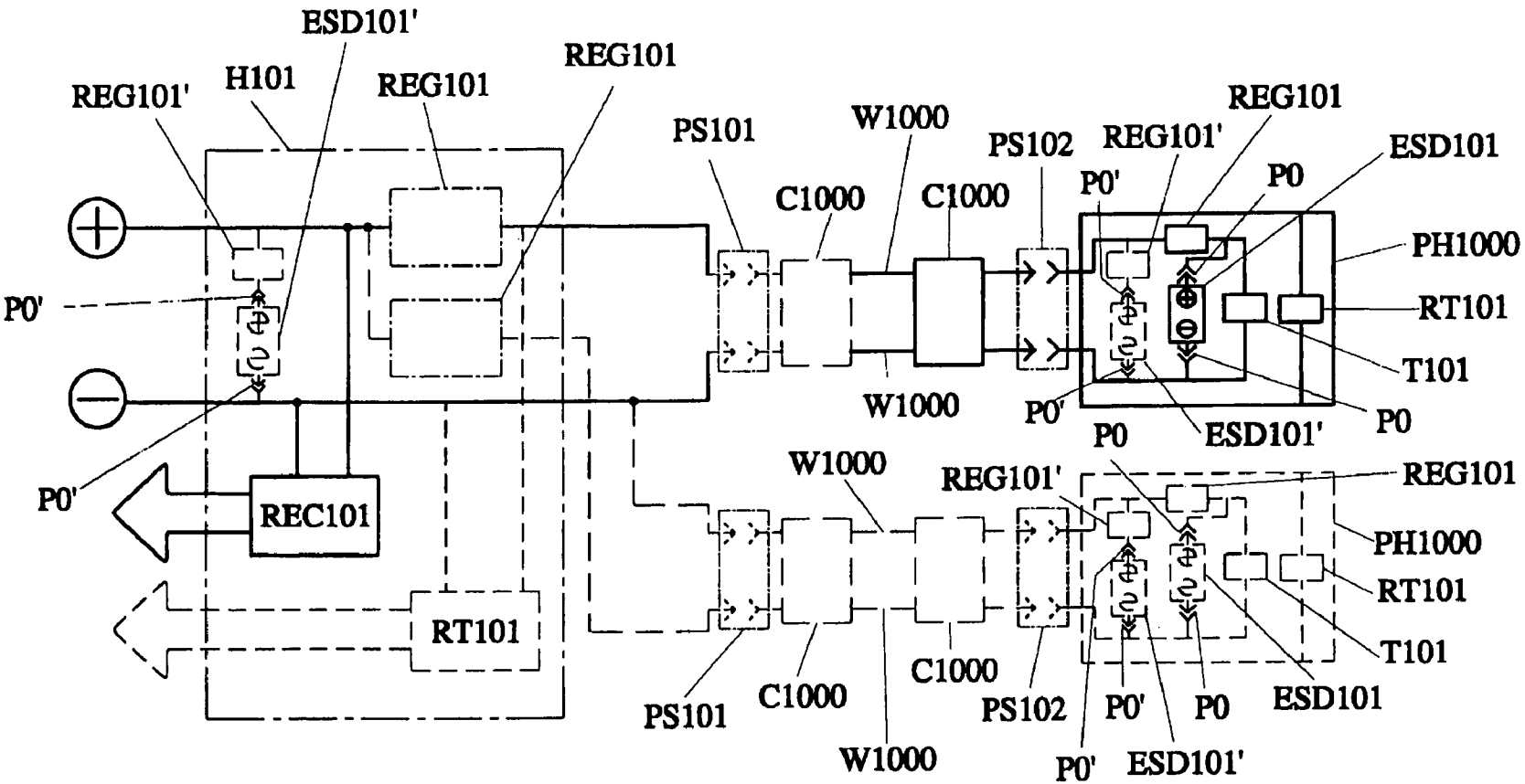
FIG. 14 illustrates an example of the invention in which charging is executed at random to a cordless peripheral using an independent power line and adaptor.

FIG. 14 is an example in which randomized charging for cordless peripheral devices is provided by an adaptor that is common to both an independent power cord and the source of power for charging purposes. One or more power lines W1000 and one or more power output interface plug/socket assembly C1000 are provided for a computer or notebook computer, information-based household electric appliance, indoor cordless telephone set, other appliance main unit, a monitor, a keyboard, a receiver or a cord-bearing interface. The adaptor provides randomized charge with respect to one or more cordless peripheral device PH1000. The power line W1000 may have both ends thereof furnished with a plug/socket assembly C1000 to associate with the power output interface PS101, power input interface PS102 or power line W1000 with one terminal connected to the power output interface PS101 or to the power input interface PS102 directly; or connected between the power output interface of a computer, a notebook computer, information-based household electric appliance, indoor cordless telephone cord, other appliance main unit, monitor, or keyboard, a receiver and the power input interface of a cordless peripheral device, or alternatively, the power line may be omitted by having the plug/socket assembly C1000 connected to the power output interface PS101 and power input interface PS102 directly.

Figure 15:
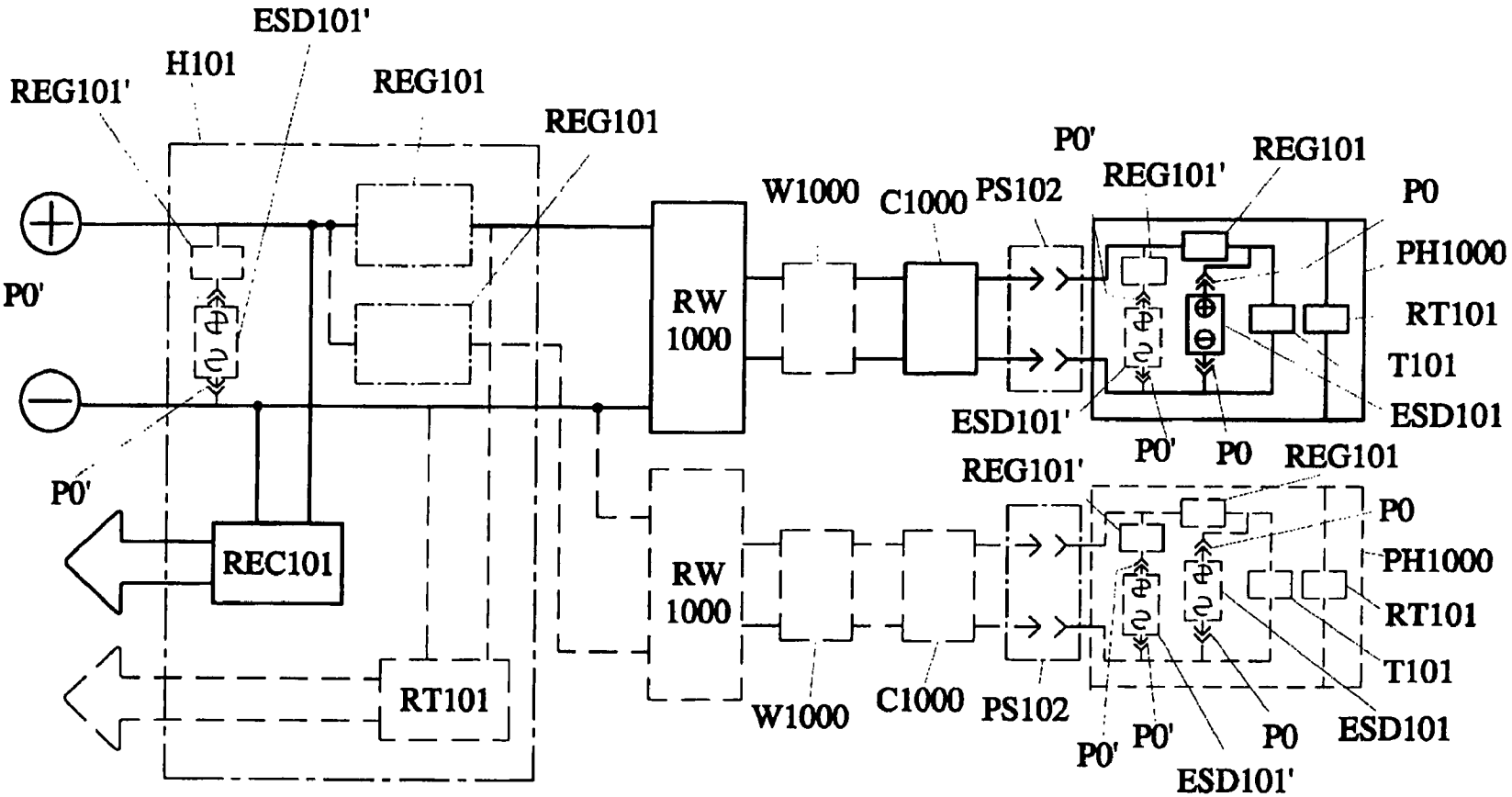
FIG. 15 illustrates an example of the invention using a power line roller device.

Alternatively, a power line roller means RW1000 serving to backwind the wire by a spring mechanism or through a manual winding technique, or an arrangement for storing powerlines facilitate using and storing of power lines to save space, may be installed. An example is illustrated in FIG. 15, wherein the power line rollup device RW1000 may be integrally structured with the associated computer, notebook computer, information-based household electric appliance, indoor cordless telephone, other appliance main unit, monitor, keyboard, receiver or other receiver housing H101 complete with a cord-bearing interface, or cordless peripheral device PH1000 or other devices, or alternatively be structured independently whereby transmission of power is made by the connection of the power line with the main unit power supply, or the power supply may be connected to the main unit in parallel with cord assembly CB100 on the receiver.

Figure 16:
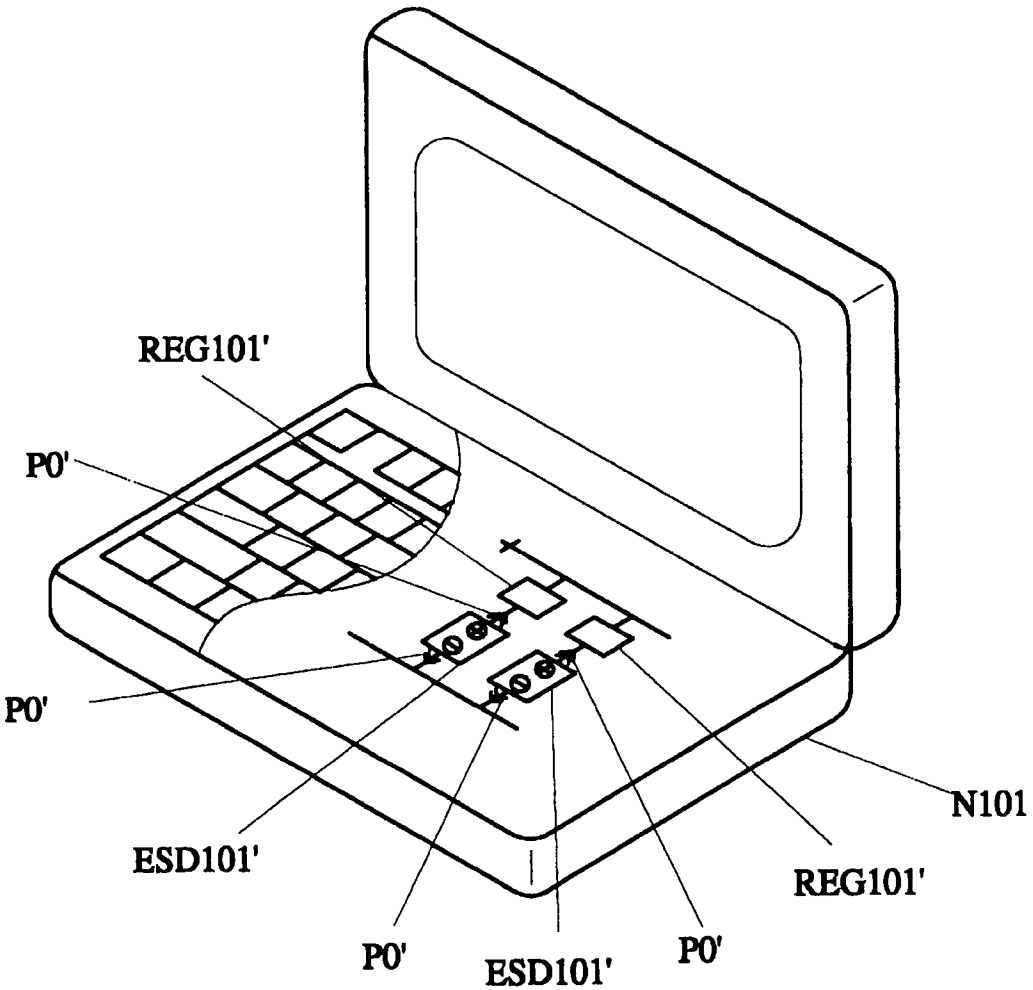
FIG. 16 illustrates an example of the invention incorporating a redundant battery for charging in a notebook computer.
Figure 17:
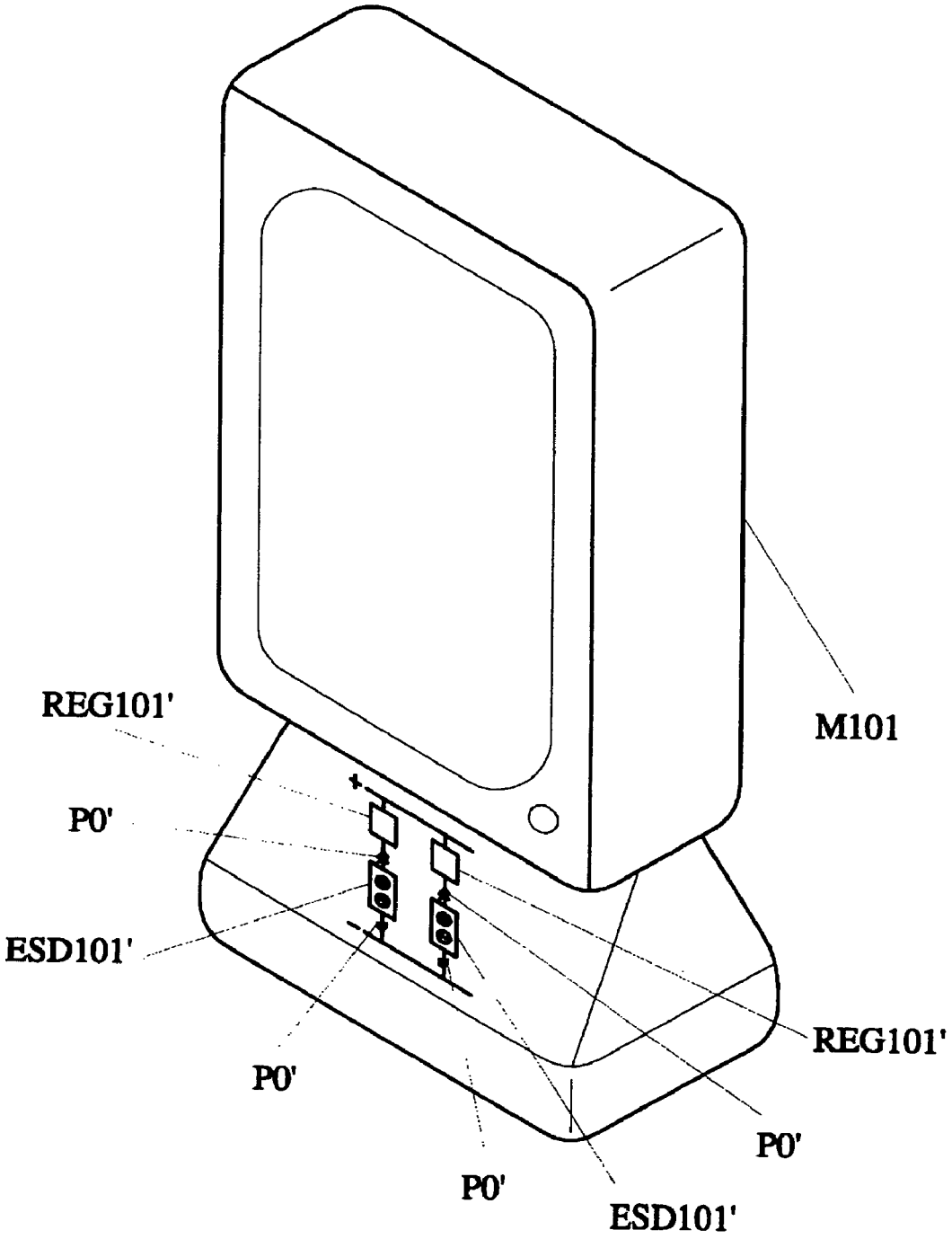
FIG. 17 illustrates an example of the invention incorporating a redundant battery for charging in a peripheral device, such as a monitor.
Figure 18:
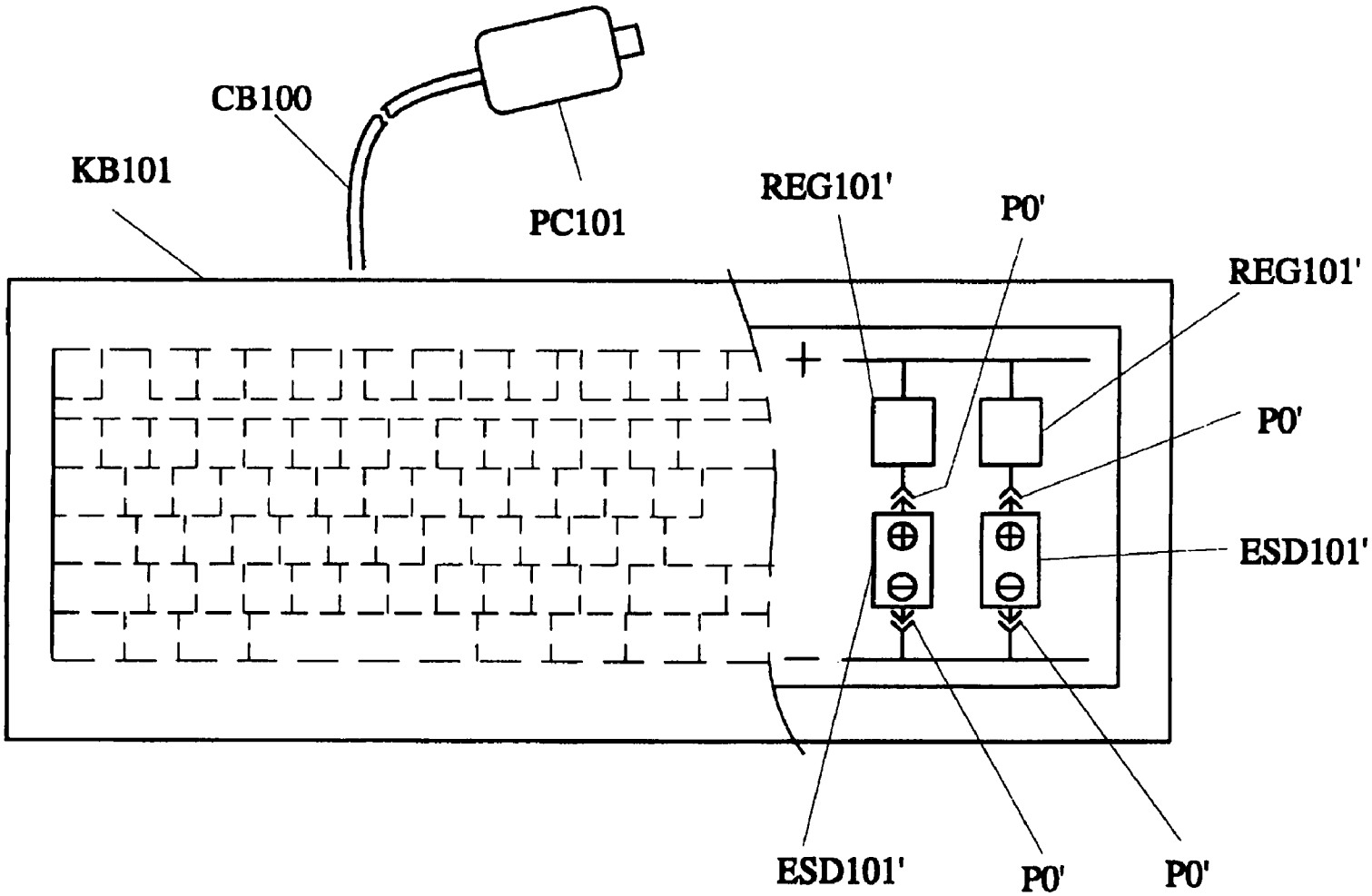
FIG. 18 illustrates an example of the invention incorporating a redundant battery arranged to randomly charge from a main power supply, in a cord-bearing keyboard.
Figure 19:
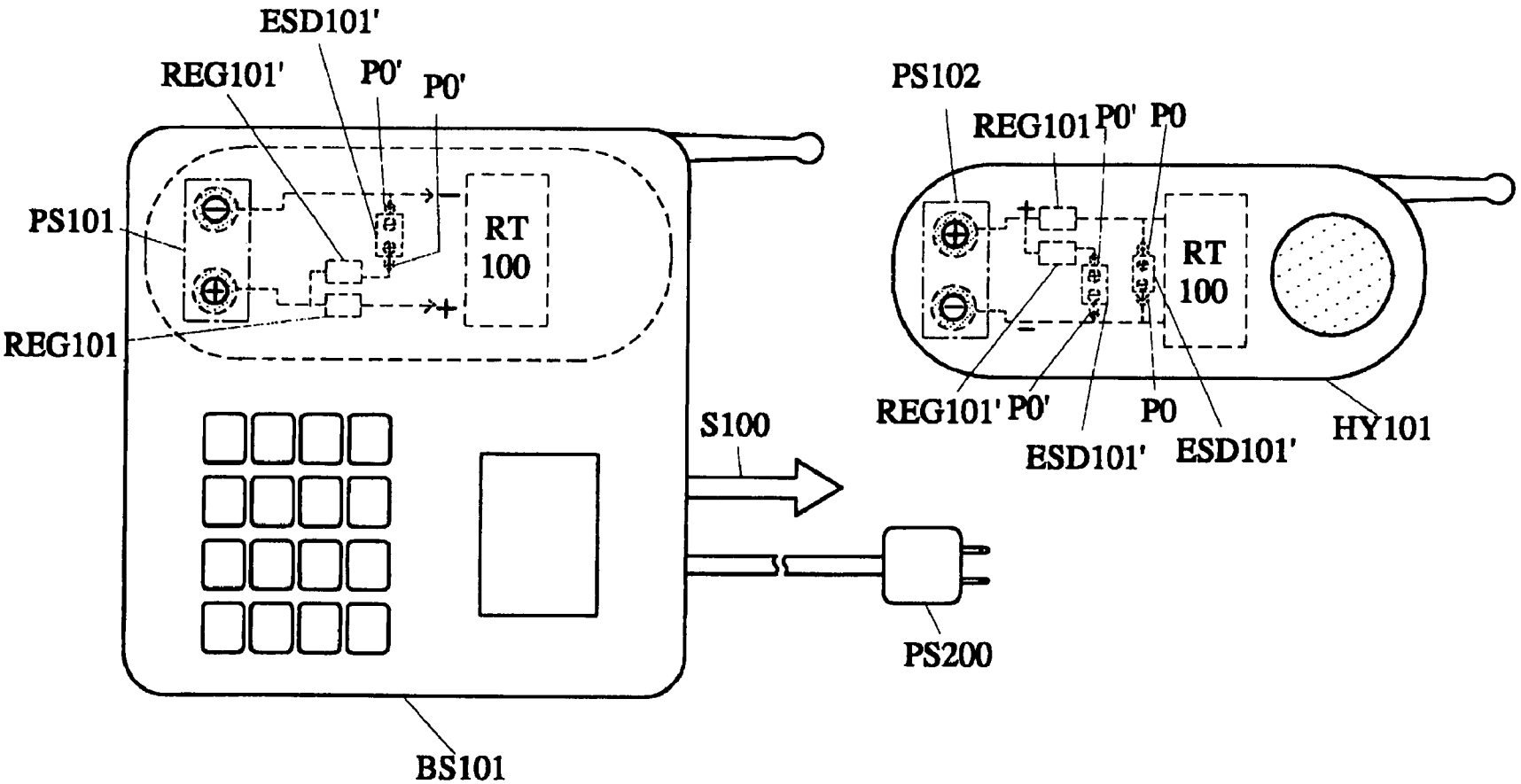
FIG. 19 illustrates an example of the invention incorporating a redundant battery or adaptor P0' featuring charging capabilities which derives its own power from a main power supply, in a cordless telephone set; and, FIG. 20 illustrations an example of the invention incorporating a redundant battery featuring charging capabilities in a cord-bearing telephone set.
Figure 20:
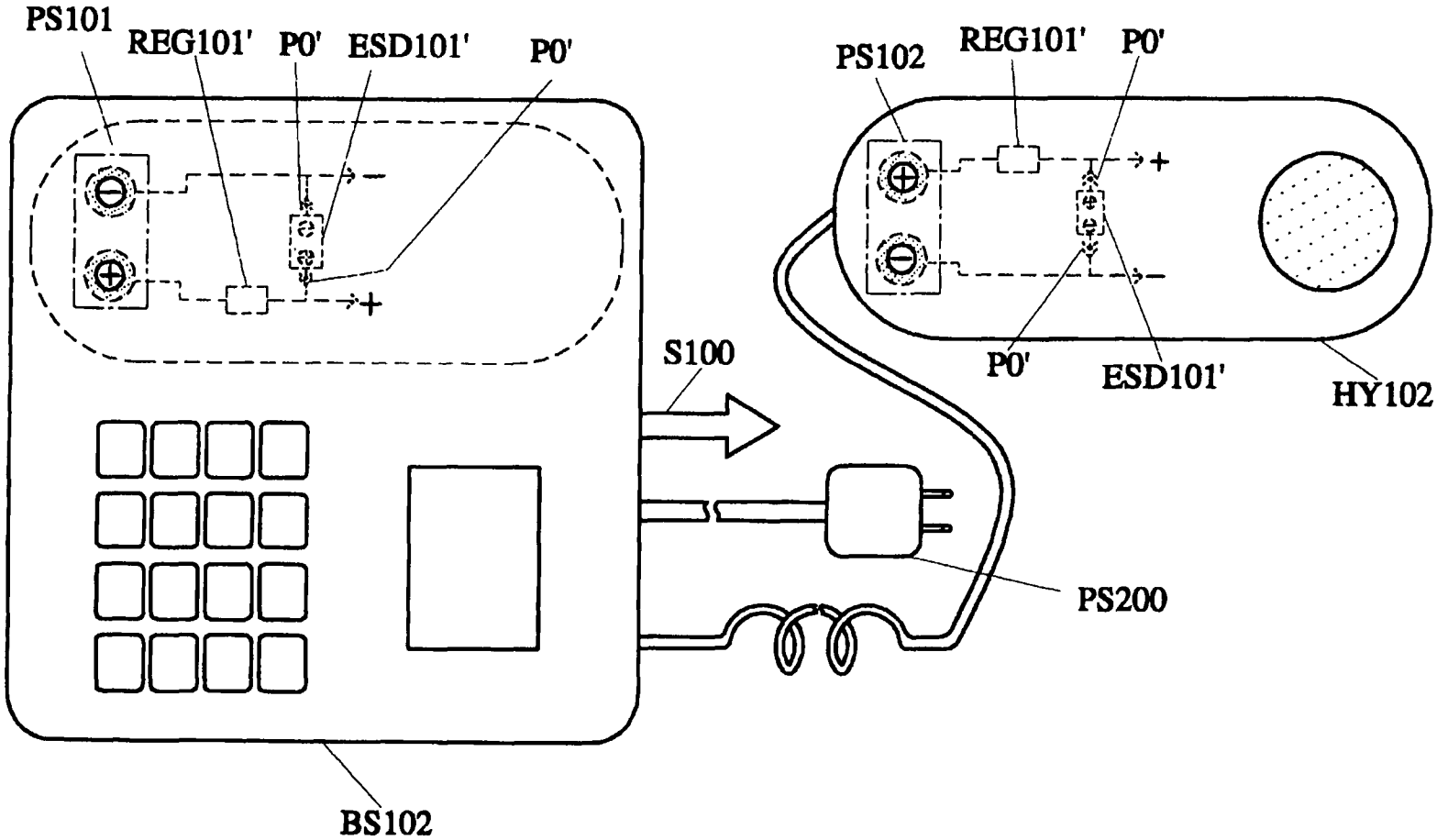

The power supply to aforementioned computer, information-based household appliances, indoor cordless telephone, or the main unit of an appliance is a redundant battery and port P0' used for charging purposes in place of a power supply, and may be arranged as follows:

(1) installed to the main unit casing of a computer, notebook computer or appliance. For example in a notebook computer, as shown in FIG. 16, one or more sets of redundant batteries and ports P0' for charging purposes is installed on a chosen position on a notebook computer housing N101, to facilitate the placement of an energy storage means ESD101' capable of charging/discharging as required. Once the energy that is stored in the energy storage means on the notebook computer itself, or the line voltage delivered to the notebook computer is converted into a low voltage D.C., it provides a randomized charging power supply to the redundant battery through the port P0' for charging purposes through regulation at the ad hoc redundant power supply control means REG101';

(2) installed on a monitor as shown in FIG. 17, there is provided one or more sets of redundant batteries and ports P0' for charging purposes on the monitor M101 into which is to be loaded a redundant electric energy storage means ESD101' into which is to be a charged power supply for release when there is a need for that, power to the redundant battery through the port P0' is fed at random as procured from the power supply on the monitor, by way of the redundant power control means REG101';

(3) installed onto a cord-bearing keyboard as shown in FIG. 18. An access wire assembly CB100 attaches to the main unit, which relates to the installation of one or more sets of redundant batteries and ports P0' for charging purposes at the bottom or other chosen location of a traditional keyboard KB101, to accommodate an energy storage means ESD101' meant to receive charging and to discharge when needed. The power supply to the redundant battery and port P0' during charging is provided in a randomized manner from the main unit D.C. source transmitted by the cord assembly CB100 on a cord-bearing keyboard, regulated at a redundant power control REG101';

(4) installed in a one-way or two-way receiver/transceiver that transmits signals and electric energy, and associated with the main unit by a cord assembly CB100. The one-way receiver or two-way transceiver is coupled with cordless peripheral means by virtue of one-way or two-way receiving/transmission signals or video/audio signals, complete with one or more sets of redundant batteries and ports P0' for charging purposes, into which is to be loaded redundant electric energy storage means ESD101' serving to receive charging and to discharge when needed. The power from the main unit power supply is delivered by cord assembly CB100, by way of redundant power control REG101', and serves as a randomized power source to the redundant battery through the port P0' for charging purposes;

(5) installed on other cord-bearing peripheral equipment comprising a main unit and a cord assembly CB100, for the purpose of power transmission and signal transmission, including, for example, a scanner, digital camera, tabulator or speaker. One or more sets of redundant batteries and ports P0' for charging purposes is installed at a chosen location as needed. Redundant electric energy storage means ESD101' charges and discharges when needed. The power delivered by cable assembly CB100 from the main unit will make for a randomized power for charging purposes to the redundant battery and port P0' by way of power control means REG101';

(6) furnished on the main unit of an information-based household electric appliance or cordless peripheral, in the form of one or more sets of redundant batteries and ports P0' for charging purposes as seen in FIGS. 1-2 or FIGS. 14-15, into which is loaded redundant energy storage means ESD101' which charges and discharges when needed;

(7) installed into the main seat of a household cordless cellular to phone set or a hand-held receiver and speaker, shown in FIG. 19. The redundant battery and port P0' receives power through the signal cord S100 on the main unit BS101, or from an auxiliary power supply PS200, which is a D.C. source of low rating voltage D.C. which is converted from line voltage. This is regulated by the redundant power control REG101' to account for a source of power with which to enable the redundant battery and port P0', and to provide randomized charging of redundant energy storage means ESD101' on the main unit BS101 of the cordless phone or on a cordless hand-held cellular handset HY101. The main unit or handset may be installed with one or more sets of redundant batteries and ports P0' for charging purposes, into which is to be loaded a redundant energy storage means ESD101' serving both to charge and to discharge when needed;

(8) installed in the casing of a household cord-bearing phone set, shown in FIG. 20. Because for the need of multiple functions in cord-bearing telephone sets, certain models already have been provided with auxiliary power sources. In this case, the power supply of the main unit BS102 signal line S100 or an auxiliary power source PS200 of low voltage D.C. converted from line voltage may account for the power needed for charging purposes to the redundant battery or adaptor P0' for charging purposes, in which case, randomized charging is made possible with respect to the redundant energy storage means ESD101' as arranged, to the main unit BS102 or hand-held handset and assembly HY102 of a cord-bearing phone set and furthermore, may be provided where appropriate, one or more sets of redundant batteries and ports P0' for charging purposes, into which is to be installed redundant energy storage means ESD101' meant to charge and discharge when needed;

(9) it and the redundant energy storage means ESD101' deployed in order may be any two or more of the devices or means, or arrangements disclosed in items 1 through 8 in this paragraph herein before.

In summary, the present invention relates to an electrical appliance equipped with a redundant battery featuring charging capabilities and, for example, be a computer, an information-based household electric appliance, an indoor cordless telephone set, another main unit housing, a monitor casing or keyboard, a receiver with a cord assembly, a cord-bearing interface or a cordless peripheral. This invention uses a low-cost randomized power transmission interface for randomly charging a secondary rechargeable cell or super capacitor, other energy storage means arranged in the primary battery as well as the redundant battery that is installed in a computer, the main unit of another appliance, keyboard, receiver, an otherwise cord-bearing peripheral casing or housing, cordless peripheral assemblies inclusive, thus, rendering unnecessary the provision of any independent charging circuit or equipment for the same purpose, which is truly a novel design permitting substantial cut of production cost while increasing the usefulness, convenience feature of the appliance processed accordingly.

What is claimed is:

1. An electrical device having a *cable including a plug/socket assembly, or at least one plug/socket assembly installed onto the electrical device itself, and having a* charging circuit for supplying power from a main power supply *of a main equipment associated with said electrical device* to [a primary storage device, wherein] said charging circuit [includes] *in order to charge* at least one redundant electrical storage device [for], *said charging circuit* receiving power from said main power supply and supplying said power to said [primary storage device] *redundant electrical storage device, and*

*wherein said redundant electrical storage device includes a primary cell, secondary cell, or super capacitor.*

[2. An electrical device having a charging circuit for supplying power from a main power supply to a primary storage device of claim 1, wherein said power supply is a power cord.]

[3. An electrical device having a charging circuit for supplying power from a main power supply to a primary storage device of claim 1, wherein said power supply is a receiver.]

[4. An electrical device having a charging circuit for supplying power from a main power supply to a primary storage device of claim 1, wherein said power supply is a receiver and power cord.]

[5. An electrical device having a charging circuit for supplying power from a main power supply to a primary storage device of claim 1, wherein said primary storage device is connected to said charging circuit by an interface.]

[6. An electrical device having a charging circuit for supplying power from a main power supply to a primary storage device of claim 5, further comprising at least one power control circuit coupled to the interface to control power from the main power supply.]

[7. An electrical device having a charging circuit for supplying power from a main power supply to a primary storage device of claim 5, wherein said interface comprises a power output interface and a power input interface.]

[8. An electrical device having a charging circuit for supplying power from a main power supply to a primary storage device of claim 5, wherein said at least one redundant electrical storage device is included before the interface and after the interface.]

[9. An electrical device having a charging circuit for supplying power from a main power supply to a primary storage device of claim 5, wherein said primary storage device is in parallel with said redundant electrical storage device.]

[10. An electrical device having a charging circuit for supplying power from a main power supply to a primary storage device of claim 9, further comprising at least one power control circuit in series with said redundant electrical storage device.]

[11. An electrical device having a charging circuit for supplying power from a main power supply to a primary storage device of claim 7, further comprising magnetic contacts to couple the power output interface and the power input interface together.]

[12. An electrical device having a charging circuit for supplying power from a main power supply to a primary storage device of claim 7, further comprising electromagnetic contacts to couple the power output interface and the power input interface together.]

[13. An electrical device having a charging circuit for supplying power from a main power supply to a primary storage device of claim 7, further comprising a polarity-error proofing geometry in conductive contacts between the power output interface and power input interface to couple the power output interface and the power input interface together.]

[14. An electrical device having a charging circuit for supplying power from a main power supply to a primary storage device of claim 7, further comprising a plug/socket assembly to couple the power output interface and the power input interface together.]

[15. An electrical device having a charging circuit for supplying power from a main power supply to a primary storage device of claim 7, further comprising conductive convex-concave contacts to couple the power output interface and the power input interface together.]

[16. An electrical device having a charging circuit for supplying power from a main power supply to a primary storage device of claim 7, further comprising concentric contacts to couple the power output interface and the power input interface together.]

[17. An electrical device having a charging circuit for supplying power from a main power supply to a primary storage device of claim 7, wherein said power input interface is included in a base unit of the electrical device and the power output interface is included in a peripheral device, said base unit and said peripheral device are in a chassis-borne engagement.]

[18. An electrical device having a charging circuit for supplying power from a main power supply to a primary storage device of claim 6, wherein said power control circuit comprises at least one photo-emitting diode and at least one current limiting resistor.]

[19. An electrical device having a charging circuit for supplying power from a main power supply to a primary storage device of claim 6, wherein said power control circuit comprises at least one zener diode.]

[20. An electrical device having a charging circuit for supplying power from a main power supply to a primary storage device of claim 19, wherein said zener diode is in series with at least one resistor.]

[21. An electrical device having a charging circuit for supplying power from a main power supply to a primary storage device of claim 6, wherein said power control circuit comprises a charging state display.]

[22. An electrical device having a charging circuit for supplying power from a main power supply to a primary storage device of claim 6, wherein said power control circuit comprises a reverse isolation diode.]

[23. An electrical device having a charging circuit for supplying power from a main power supply to a primary storage device of claim 3, wherein the receiver circuit comprises solid-state circuitry or electro-mechanical components to convert input by manual operation or audio or video signals into electrical signals.]

[24. An electrical device having a charging circuit for supplying power from a main power supply to a primary storage device of claim 2, wherein the power cord is an interface connection.]

[25. An electrical device having a charging circuit for supplying power from a main power supply to a primary storage device of claim 3, wherein said receiver circuit further comprises a transceiver to receive and transmit signals.]

[26. An electrical device having a charging circuit for supplying power from a main power supply to a primary storage device of claim 8, further comprising a peripheral device which comprises said power input interface, said redundant electrical storage device and said primary storage device, wherein said peripheral device further comprises solid-state circuitry or electro-mechanical components to convert input by manual operation or audio or video signals into electrical signals.]

[27. An electrical device having a charging circuit for supplying power from a main power supply to a primary storage device of claim 26, wherein said peripheral device further comprises a transceiver to receive said electrical signals and transmit R.F., infrared or ultrasonic signals to a transceiver in said receiver circuit.]

[28. An electrical device having a charging circuit for supplying power from a main power supply to a primary storage device of claim 6, wherein the energy storage device is randomly charged by the power control circuit.]

[29. An electrical device having a charging circuit for supplying power from a main power supply to a primary storage device of claim 23, said receiver further comprising a transceiver to receive said electrical signals and transmit R.F., infrared or ultrasonic signals to a transceiver in a peripheral device.]

*30. An electrical device as claimed in claim 1, further including a battery seat for removably mounting said redundant storage device in said main equipment, a wired peripheral device, or a receiver of a wireless peripheral device.*

*31. An electrical device as claimed in claim 1, wherein said main equipment is selected from the group consisting of a computer, a telephone set, and an electric appliance.*

*32. An electrical device as claimed in claim 1, wherein said electrical device is selected from the group consisting of a wired mouse, a wired trackball, a wired keyboard, and a wired telephone set.*

*33. An electrical device as claimed in claim 1, wherein said electrical device is selected from the group consisting of a wireless mouse, a wireless trackball, a wireless keyboard, or a wireless telephone set.*

*34. An electrical device as claimed in claim 1, wherein said charging circuit is further arranged to charge a primary electrical storage device of the electrical device.*

*35. An electrical device as claimed in claim 34, wherein said primary electrical storage device includes various chargeable/dischargeable electrical storage devices such as a primary cell, secondary cell, or super capacitor.*

*36. An electrical device as claimed in claim 1, wherein said electrical device is a wired peripheral device further provided with at least one cable having at least one plug/socket assembly or directly provided with at least one plug/socket assembly for external power output or for simultaneously power output and signal transmission, in addition to said cable with a plug/socket assembly for connecting with the main equipment.*

*37. An electrical device as claimed in claim 1, wherein said electrical device is a wireless peripheral further provided with at least one cable having at least one plug/socket assembly or directly provided with at least one plug/socket assembly for external power output or for power output and signal transmission, in addition to said cable with a plug/socket assembly.*

*38. An electrical device as claimed in claim 1, wherein said electrical device is a wireless peripheral device capable of wireless transmission, and said wireless transmission is selected from the group consisting of radio frequency, infrared, or ultrasonic transmission.*

* * * * *